E. E. GOLD.
SAFETY VALVE.
APPLICATION FILED OCT. 25, 1907.

909,886.

Patented Jan. 19, 1909.

WITNESSES:
Fred White
René Bruine

INVENTOR:
Edward E. Gold,
By Attorneys,

UNITED STATES PATENT OFFICE.

EDWARD E. GOLD, OF NEW YORK, N. Y.

SAFETY-VALVE.

No. 909,886.      Specification of Letters Patent.      Patented Jan. 19, 1909.

Application filed October 25, 1907. Serial No. 399,130.

*To all whom it may concern:*

Be it known that I, EDWARD E. GOLD, a citizen of the United States, residing in the borough of Manhattan, city, county, and State of New York, have invented certain new and useful Improvements in Safety-Valves, of which the following is a specification.

This invention relates to valves, and aims especially to provide an improved automatic relief valve for car heating systems. In my Patents Nos. 563,371, of July 7, 1896, and 661,603, of November 13, 1900, I have shown valves specially designed for such use and in which the valve proper or valve body is made of a ball or block of yielding material, or is a compound member with a facing of relatively unyielding material and a backing of relatively yielding material. My present invention provides certain features of improvement specially adapted for this class of valves as well as certain features which may be used with valves of other design.

Where the valve body has been depended upon entirely to provide the yielding effect, its efficiency diminishes in the course of time, so that it requires to be renewed. In order to keep it tight upon its seat the trainman presses it down harder and harder as it loses its resiliency, so that there is danger of a point being reached at which it will fail to open to the determined pressure, and an explosion is liable to result. According to the present invention the ball or block is pressed against the seat by means of a spring of at least as great and preferably greater stiffness, instead of by the rigid threaded devices used with previous constructions. In case the material of the ball has so far lost its elasticity as to fail to respond to the desired pressure, the spring referred to will respond to a slightly greater pressure, and explosion or other damage will thus be avoided. The failure to renew a ball after it has lost its resiliency will not therefore be attended with such serious results. In fact the valve may be used until the ball is so distorted that, although the adjusting screws are turned as far as possible, the ball will cease to close the opening. Thereupon a new ball will be inserted and the parts adjusted to their outermost position.

The accompanying drawings illustrate an embodiment of the invention.

Figure 1:
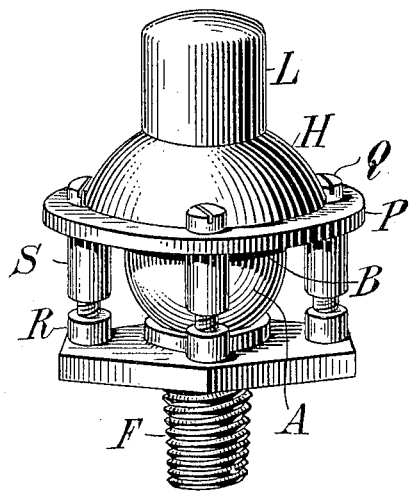
Figure 2:
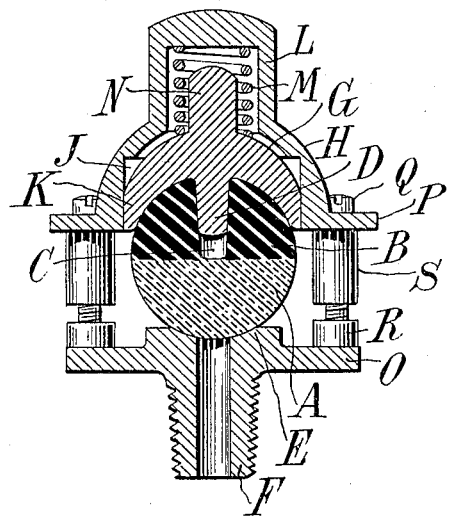

Figure 1 is a perspective view of a complete valve. Fig. 2 is a vertical sectional view of the same.

Referring to the embodiment of the invention illustrated, the ball or block may be of the composition described in my later patent above referred to; that is, with a facing member A of semi-yielding composition such as Jenkin's packing material, and with a backing member B of rubber or similar elastic material; the two parts being cemented or otherwise fastened to each other, and the upper part B being formed with a socket C which receives a guiding projection or pin D of the holder so as to prevent displacement of the ball. The ball seats upon a valve-seat E having a threaded extension F by which it is screwed into the upper end of a pipe or other member to which the complete valve is to be attached. The inner holder G fits the upper part of the valve body and forces it against the valve seat to hold the valve closed with a pressure depending upon the composition of the parts A and B of the ball, and upon the position of adjustment to which the holder G is set.

An outer holder H is provided, and has formed therein a cylindrical recess J in which a cylindrical portion K of the inner holder is fitted to slide vertically. The outer holder H is provided with a hollow extension L carrying a spring M which surrounds a stem N on the top of the inner holder G and which presses against the top of the inner holder.

The valve-seat E is provided with a flange O, and the outer holder L with a corresponding flange P, and these flanges are forcibly brought toward each other by means of screws Q screwing into lugs R upon the valve-seat flange. Spacers S are arranged between the two flanges, as integral extensions from the flange P, for example.

The spring M is made substantially stronger than the more elastic member B of the ball, and the spacers S are of such length as to leave a certain amount of play between the parts, so that the valve may always open under an excess of pressure. As the pressure for which the valve is to be set is raised, or as the efficiency of the more elastic part B of the ball diminishes, the outer holder H is adjusted toward the valve by turning the screws Q. The movement of the outer holder, through the stiff spring M, effects a movement of the inner holder and a further compression of the ball so that the latter presses more firmly on the valve seat. When the ball has so deteriorated that it is necessary to adjust the holder to the limit allowed by the extensions S, a new ball is substituted and a new adjustment effected.

The pin D of the inner holder substantially fits the cross-section of the opening C in the center of the ball, but does not extend to the bottom of such opening. The inner holder G hugs the more elastic member B of the ball upon the outside, but, like the central pin D, does not extend over the full depth of the elastic member. By this construction the upper and therefore smaller part of the ball is held firmly against distortion, the change of shape when it yields being necessarily below the holder G and pin D. As the width is greatest below these members, so the lateral strength is also greatest. By thus protecting the weakest upper portion of the ball against distortion under strain, the life of the ball is extended.

The advantages of using the described arrangement may also be, at least in part, availed of where the ball or body A is of different composition from that shown. For example, it may be a solid block of hard rubber or other material suitable for effecting a tight closure of the valve.

What I claim is:—

1. A valve including, in combination, a seat, a ball, a holder, and yielding means for pressing said holder and ball toward the valve seat.

2. A safety valve including, in combination, a seat, an elastic ball constituting the valve body, a holder, and a spring arranged to normally press the holder and ball toward said seat with a yielding pressure.

3. A valve including, in combination, a valve seat, an elastic body, an inner holder engaging said body and pressing the same against said seat, an outer holder which is adjustable toward the valve seat, and a spring transmitting the adjustment of said outer holder to said inner holder.

4. A valve including, in combination, a valve seat, an elastic body, an inner holder engaging said body and pressing the same against the valve seat, an outer holder which is adjustable toward the valve seat, a spring transmitting the adjustment of said outer holder to said inner holder, and means for limiting the adjustment of the outer holder toward the valve seat.

5. A valve including, in combination, a valve seat, a yielding body, an inner holder G adapted to press said body against its seat, an outer holder H having a guiding socket J in which said inner holder moves and having a hollow portion L, a spring M in said hollow portion bearing against the member G, and means for adjusting said outer holder H toward the valve seat.

6. A valve including, in combination, a valve seat, an elastic ball, and a holder engaging and pressing said ball against said seat, said holder having a projection entering said body, and said holder and projection fitting close against the upper part of said body so as to prevent distortion thereof under pressure.

In witness whereof, I have hereunto signed my name in the presence of two subscribing witnesses.

EDWARD E. GOLD.

Witnesses:
Domingo A. Usina,
Fred White.